March 5, 1957 A. W. KLOMP 2,783,626
UNIVERSAL JOINT
Filed July 12, 1954 2 Sheets-Sheet 1

INVENTOR.
ALFRED W. KLOMP
BY
ATTORNEYS

March 5, 1957  A. W. KLOMP  2,783,626
UNIVERSAL JOINT
Filed July 12, 1954  2 Sheets-Sheet 2
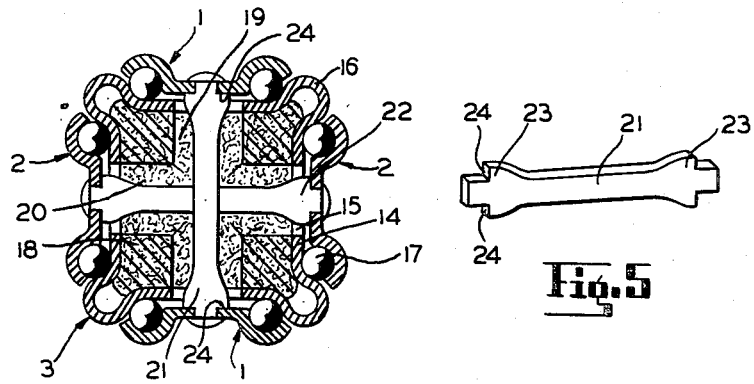
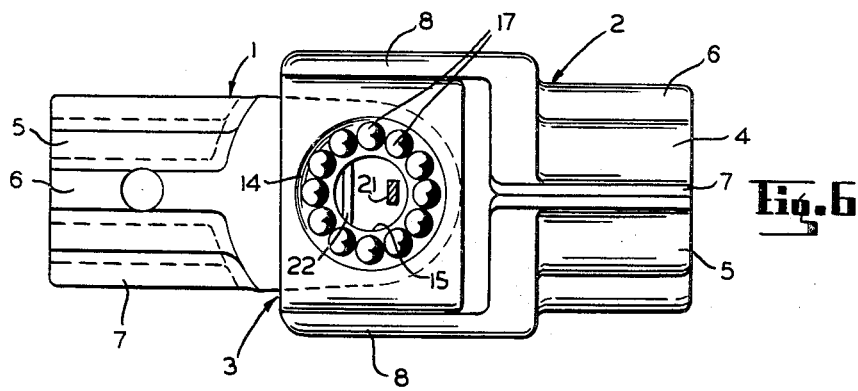
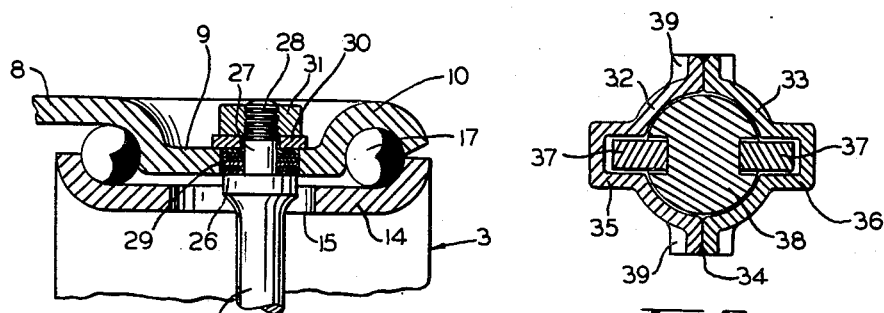
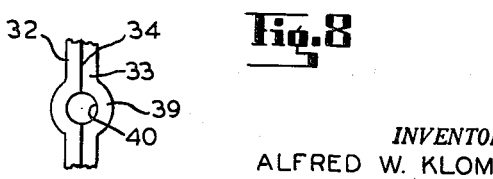
INVENTOR.
ALFRED W. KLOMP
BY
ATTORNEYS

United States Patent Office 2,783,626
Patented Mar. 5, 1957

2,783,626

UNIVERSAL JOINT

Alfred W. Klomp, Detroit, Mich., assignor to Process Gear and Machine Company, Detroit, Mich., a corporation of Michigan Application July 12, 1954, Serial No. 442,489

8 Claims. (Cl. 64—17)

This invention relates to improvements in a universal joint, and more particularly to a universal joint highly desirable for usage wherever a Cardan type joint is utilized, although by virtue of its advantages as will be apparent hereinafter, the joint will have many other uses and purposes, as will readily occur to one skilled in the art.

In the past, many and various types of universal joints had been developed, and these joints have been subject to many objections and disadvantages which have heretofore been more or less tolerated. Although these objections and disadvantages were at least in part true concerning various types of universal joints, they were especially true concerning the lower priced joints and particularly true of joints of the Cardan type or Hooke joint. Nevertheless, universal joints heretofore have not been produced at as low a cost as is desirable.

For example, universal joints have heretofore required machining of various parts, frequently the attachment of separate hubs to the yokes of the joint, and the utilization of lubrication fittings, all of which objectionably add to the cost of manufacture. In addition, these formerly known joints very frequently would not satisfactorily retain the lubricant, dirt was bound to enter either from the gun or the fitting when lubricant was added, and unless adequate lubricant was always available, parts of the joint would unduly wear. Further, heretofore universal joints, particularly the plain bearing type joints, had very poor load carrying ability in proportion to their size, would not stand up even a reasonable length of time especially when operating at a relatively large angle from shaft alignment, were not uniform as to like parts so that the balance was less than desirable, they could not be preloaded, and they could not be adjusted or taken up when worn. Also, universal joints heretofore known were subject to forces during operation other than a compression on the working or relatively moving parts and the parts had no resiliency to avoid an indentation effect upon sudden shocks, this being particularly true with joints utilizing needle and roller bearings when forces acted to skew the bearings. It should also be particularly noted that insofar as I am aware, no universal joint has ever been provided that avoided rubbing contact as distinguished from rolling contact between some relatively movable parts of the joint. In other words, no joints heretofore made have avoided rubbing friction between at least some surfaces. Likewise, insofar as I am aware there has not been a ball bearing universal joint heretofore manufactured or developed.

With the foregoing in mind, it is an important object of the instant invention to provide a universal joint that may be manufactured more economically than any practical universal joint heretofore produced.

Another object of the invention is the provision of a universal joint in which no relative movement between parts occurs without the action being on a rolling contact between parts. In other words, regardless of the character of force applied there is no rubbing friction between any parts.

It is also an object of this invention to provide a universal joint in which no surface need be machined.

Another object of the invention is the provision of a ball bearing universal joint.

It is also a feature of this invention to provide a ball bearing universal joint in which all parts of the joint except the balls themselves are stampings.

Still another feature of the invention resides in the provision of a universal joint that is lighter in weight than joints heretofore produced, yet capable of carrying great loads in proportion to its size, and operating highly satisfactorily even at wide angles from shaft alignment.

A further object of the invention resides in the provision of a universal joint in which the necessary hubs are integral parts of the yoke elements.

The instant invention also seeks the provision of an economical universal joint that is devoid of lubricant fittings, but does embody an economical lubricant retaining element so arranged as to automatically cleanse an appliance utilized to replenish lubricant from time to time.

Another feature of the invention resides in the provision of an economical Cardan type universal joint, wherein the opposite sides of each yoke member are effectively tied together against separation, thus adding materially to the life of the joint.

A further object of the invention resides in the provision of a simple form of universal joint in which both the body part and the yoke members are simple stampings, and thus uniform in character, with the openings through the hub portions of the yoke members concentric with the rest of the structure, so that the joint is in balance when operating.

A further feature of the invention resides in the provision of a simple form of universal joint, wherein the load carrying means are disposed very near to the so-called "swing" circle of the joint or maximum circumference of the joint, thus materially lessening the load on the moment arm acted upon by adverse forces tending to break the joint whereby the joint is enabled to carry a much heavier load than joints of this character heretofore developed.

Still another object of the invention resides in the provision of a simple form of universal joint wherein regardless of the movement of the joint during operation the force acting on contacting parts of the joint is limited to compression, tension on connecting parts being entirely eliminated, and even when the shafts tend to pull apart there is only compression forces acting on the connecting parts of the joint.

It is also a feature of this invention to provide a universal joint of the Cardan type, wherein the joint may be readily assembled, and yet preloaded; that is, the yoke members may exert an inward force initially upon the bearing means between the arms of the yoke members and the body part, which structure materially increases the life of the joint, and eliminates backlash.

It is also an object of this invention to provide a universal joint of an economical Cardan type character wherein means are provided for an adjustment or takeup of the arms of the yoke members after the joint has become worn to some extent, thereby materially increasing the life of the joint and eliminating the necessity of replacement for a considerable time.

Still another feature of the instant invention resides in the provision of an economical form of universal joint in which one of the main parts of the joint possesses inherent resiliency enabling it to yield slightly with sudden shocks, thereby eliminating the adverse effect of sudden shocks upon the contacting parts, and particularly upon the bearing means.

While some of the more salient features, characteristics and advantages of the instant invention have been above pointed out, others will become apparent from the following disclosures, taken in conjunction with the accompanying drawings, in which—

Figure 4 is a transverse sectional view taken substantially as indicated by the line IV—IV of Fig. 2;

Figure 5 is an isometric projection of one of the connecting elements or rivets, prior to incorporation in the joint;

Figure 6 is a plan view of the joint, showing the same in position for shaft alignment, but with half the lefthand yoke member removed, and one part shown in section;

Figure 7 is an enlarged fragmentary sectional view, corresponding in location to the upper central portion of the showing in Fig. 2, but illustrating a different form of construction;

Figure 8 is a transverse sectional view through the hub portion of one of the yoke members, corresponding in location to Fig. 3, but showing a still different form of construction; and Figure 9 is a fragmentary plan view of a portion of the structure of Fig. 8.

As shown on the drawings:

Figure 1:
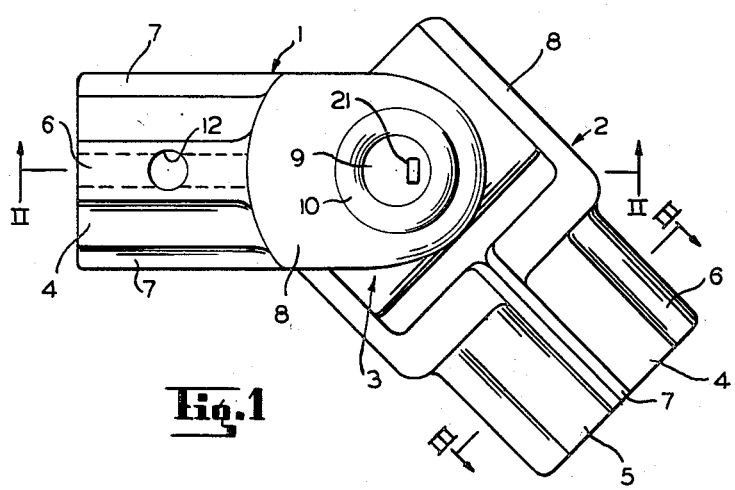
Figure 1 is an elevational view of a universal joint embodying principles of the instant invention, and showing one of the parts of the joint disposed at a relatively large angle from shaft alignment.
Figure 2:
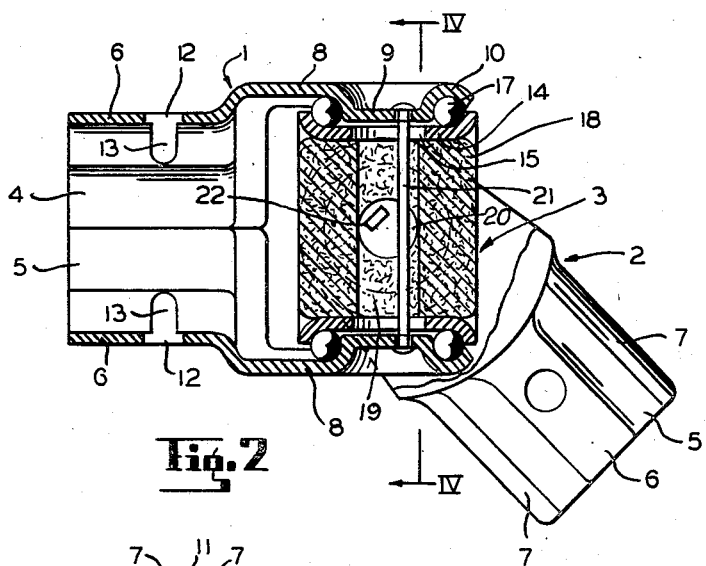
Figure 2 is a part sectional part elevational view of the structure of Fig. 1, the section portion being taken substantially as indicated by line II—II of Fig. 1, looking in the direction of the arrows, and with parts shown in elevation.

In that illustrated embodiment of the instant invention seen in Figs. 1 to 6 inclusive, there is shown a simple form of Cardan type universal joint including a yoke member generally indicated by numeral 1, a yoke member generally indicated by numeral 2, and a body member generally indicated by numeral 3. Both yoke members are identical in construction, but one of them is, of course, disposed at an angle of 90° to the other when the joint is assembled.

Each yoke member is made up of a pair of identical halves, and each yoke half portion is a simple stamping from a sheet of stock. For purposes of clarity, the halves will be designated by separate reference numerals 4 and 5, although, as stated just above, they are identical.

Figure 3:
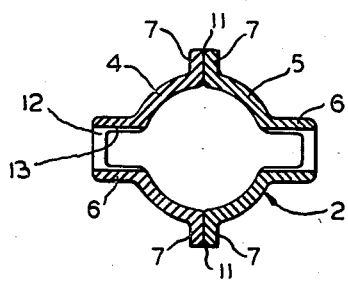
Figure 3 is a transverse sectional view taken substantially as indicated by the line III—III of Fig. 1.

From the showing more particularly in Figs. 1 and 3 it will be seen that each half yoke member includes a hub portion embodying an outwardly pressed, substantially flat topped rib 6, and a pair of opposed flanges 7—7, the yoke portion being generally circular in between each flange 7 and the rib 6. Extending from one end of the half hub part is a driving arm 8 formed with a circular indentation 9 to define an annular half ball race 10 therearound.

The half yoke members 4 and 5 are brought together with the flanges 7—7 on each in confronting relationship with the flanges on the other, as seen best in Fig. 3, and the yoke members are welded together as indicated at 11—11 to provide a complete yoke member for the joint having a pair of opposed forwardly projecting driving arms 8—8, and an integral hollow hub portion.

Through each composite hub portion thus provided on a yoke member, a pair of opposed holes 12—12 are provided for a drive bolt which locks the respective yoke member to a shaft. From the showing particularly in Fig. 2, it will be noted that these holes are given a diameter such as to establish a slight groove 13 along each side wall portion of the respective rib 6. Thus, the drive bolt when put in position bears against the side walls of each rib 6, rather than just the thickness of the metal in the outer face of the rib, whereby the torque of the drive bolt is distributed over a wide area, instead of just the thickness of the metal, adding greatly to the life of the joint and permitting the use of relatively light weight stock in the making of the joint.

The body part or cross member 3 of the joint is also a simple form of stamping. The body part is hollow, that is it is open at both ends, and is generally square in cross section, as seen in Fig. 4. Each face of the body part is provided with a circular indentation 14, seen best in Fig. 6, to provide a half ball race, and the indented part 14 is provided with a central aperture 15. All four sides of the body part are identical. Each corner junction between the side faces of the body part is in the form of an inwardly open curvate or arcuate portion as indicated at 16 in Fig. 4. These corner arcs give resiliency to the body part, so that the body will yield slightly with sudden shocks or impact loads occurring during use of the joint, and eliminate the chance of the parts becoming indented, somewhat in the manner an indentation is made in a Brinell test.

The indentation 4 in each face of the body part, and the corresponding half ball race 10 in the respective arm of one of the yoke members forms a complete raceway for a series of balls 17. In the illustrated instance, there are twelve such balls in each raceway, and there are four raceways, making a total of 48 balls utilized in the joint. With this arrangement, it will be particularly noted that the only contact between the arms 8—8 on each of the yoke members and the body member 3 is by way of the balls. Now with reference to Fig. 4 it will be seen that the balls are located very close to the maximum swing circle of the parts of the joint, so that there is an exceedingly small lever arm for forces tending to break the joint. The load will always be carried on the center line of the balls, and with this arrangement with the ball center line near the maximum outside circle of the joint, a given size joint will carry a much greater load than has heretofore been possible.

Inside the body 3 of the joint is a lubricant retaining block 18, preferably made of felt or equivalent material. The block substantially fills the inside of the body member 3, and as seen clearly in Fig. 4, the block is cross bored to provide a tubular passage 19 extending in one direction, and a second tubular passage 20 at right angles to the first passage. These passages communicate at their ends with the respective apertures 15 in the faces of the body member. The lubricant retaining block 18 stays in position, and lubricant is added by inserting a needle on the end of a lubricant gun directly through the block into one of the cross passages 19 or 20, and then filling the interior of the block with lubricant. By the aid of the retaining block 18, lubricant will be retained for the four ball bearings much longer than is usual, and it will be noted that there is no need whatever for any lubricant fittings, but better results are obtained than with lubricant fittings by virtue of the fact that the lubricant needle is always cleansed of any dirt or foreign matter when penetrating the block, and when the needle is withdrawn, the hole made thereby is automatically closed by the self-sealing characteristics of the block.

The two arms of each yoke member 1 and 2 are preferably tied together to avoid any possibility of spreading during operation. This is accomplished by means of a pair of transversely disposed rivets 21 and 22, one such rivet extending through the passage 19 in the lubricant retaining block 18, and the other rivet extending through the passage 20. Both these rivets are identical, and in Fig. 5 I have illustrated one of them. The rivet is preferably a stamping, flat in character, and provided with expanded head end portions 23—23 to provide on each end of the rivet a pair of opposite shoulders 24—24. These shoulders as clearly seen in Fig. 4 abut the underside of the respective arm 8 of the yoke member, the rivet extending through a suitable aperture provided in the recess portion 9 of that arm. With this arrangement, any twisting or bending load upon the arms of either yoke member is counteracted by the shoulders 24 on the same side of one of the rivets.

Further, it should be particularly noted that with the aid of the rivets, the joint may be preloaded, and that has not been possible heretofore, especially in connection with low cost universal joints. By simply making the rivet with the distance between the shoulders 24 at opposite ends slightly shorter than the distance between the respective arms 8 of the yoke member, when the rivet is secured to the yoke member, the arms will be drawn slightly inwardly to create an initial preloading pressure on the opposed series of balls against the opposed faces of the body member 3. This insures long life of the joint, and effectively prevents any rattling of the balls during use.

Now it will be noted that, owing to the fact that the entire joint, except for the balls, comprises only stampings, the parts are alike insofar as the halves of each yoke member is concerned, and the body member will be even on all sides, so the joint will be in balance. By virtue of the construction as above explained, the joint is capable of carrying a great load and yet is made of extremely lightweight material. As noted above, the only contact between the parts of the joint is by way of the balls, and that is only rolling friction. There is no rubbing friction possible in the joint at any time. Further, all the forces on the joint during operation are compressive forces, and there is never any tension on any connecting parts, even when the shafts tend to pull apart. Also, the drive bolts for the respective shafts, bear against the walls of the hub part, and not just against the thickness of the metal. All in all, the joint is simple in construction, smooth in action, and is highly economical to manufacture.

In Fig. 7 I have illustrated a slightly different construction of the instant invention, wherein a round tie member 25, shouldered at 26, is utilized instead of each of the rivets 21 and 22. Outside of the shoulder, the tie member or bolt 25 is provided with a smooth portion 27 and then a threaded portion 28. Around the smooth portion 27 a laminated shim 29 is utilized, a washer 30 is loosely disposed outside the shim, and a nut 31 is tightened down, compressing the shim between the washer 30 and the shoulder 26 on the bolt. The opposite end of the bolt is the same identical construction. The other bolt, for the arms of the other yoke member is also the same construction. With this arrangement, should the joint become somewhat loose after long usage, it is a simple expedient to remove both the nuts 31 from a bolt, and peel off one or two laminations of the shim and this is done at both ends of the bolt. Then when the nuts are replaced and tightened down, there is a takeup in the arms of the respective yoke member to compensate for the looseness that has occurred. Removing shim laminations from both ends of the bolt keep the entire joint in balance.

In Figs. 8 and 9, I have illustrated a still different form of the invention, and in this instance the hub portion of each yoke shell is made to accommodate drive or driven shaft keys. It will be understood that the showing is representative of the hub portions of both the yoke members 1 and 2. In making the hub portion, the two shells 32 and 33 are welded together as at 34 in the same manner above described. However, while the ribs are provided on the shells, as indicated at 35 and 36, no aperture is provided in either rib for a drive bolt, and these ribs therefore form keyways for opposed shaft keys 37—37 in a shaft 38. In order to provide a drive bolt, if the same is desired, the welded flange portions of the shells 32 and 33 are expanded as indicated at 39, to define an opening 40 for the drive bolt. Such expansion of these portions of the shells obviously provides an effective length of wall surface for the drive bolt to bear against upon torsional stresses, rather than the mere thickness of the metal going to make up each shell. Otherwise, the operation of the structure shown in Figs. 8 and 9 is the same as that previously described.

It will be understood that modifications and variations may be effected without departing from the scope of the novel concepts of the present invention.

I claim as my invention:

1. In a universal joint, a pair of yoke members, a hollow body member having a face for confronting relationship with each arm of said yoke members and an aperture in each said face, bearing means between each said face and the corresponding yoke member arm and a pair of connecting elements each extending through said body and the corresponding apertures to tie together the opposing arms of a yoke member.

2. In a universal joint, a pair of like yoke members, a body member, and ball bearings providing the only direct connection between the arms of the yoke members and the body member, said bearings being located adjacent the maximum swing circle of the joint, and a tie member joining the arms of each yoke member, both said tie members extending through said body member.

3. In a universal joint, a pair of yoke members, a hollow body member having an aperture in each side face thereof, ball bearing means between the arms of the yoke members and the corresponding side faces of the body member and a tie member joining the arms of each yoke member, both said tie members extending through said body member.

4. In a universal joint, a pair of yoke members each having a pair of spaced confronting arms, a hollow body part having a face for confronting relationship with each said arm and a central aperture in each said face, bearing means between each said face and the respective arm around the aperture in the face, a relatively soft lubricant retaining block in said body part, said block having cross passages therein leading to said apertures, and a tie member extending through each passage in said block and connected at its ends to the arms of a yoke member.

5. In a universal joint, a pair of yoke members each having a pair of spaced confronting arms, a hollow body part having a face for confronting relationship with each said arm and a central aperture in each said face, an annular series of balls around each aperture between the respective face and the respective arm, and a relatively soft lubricant retaining block in said body part having a continuous opening leading from the central portion of the block to each aperture.

6. A yoke member for a universal joint, comprising a pair of metal stampings secured together to provide an integral hub portion and a pair of spaced confronting arms extending therefrom, said hub portion having a pair of opposed hollow ribs thereon, said ribs having confronting apertures therein to accommodate a drive bolt, and the side walls of each rib being grooved adjacent each aperture to provide added bearing surface for the drive bolt.

7. In a universal joint, a pair of like yoke members each made of two complemental stampings secured together, each arm of each yoke member having an inwardly open annular groove to act as half a ball race, an open-ended box-like body member which is also a stamping and having an outwardly opening annular groove in each face thereof to complete a ball race with the groove in each said yoke arm, a series of balls in each said race, said body member having an aperture inside each ball race portion thereof, and a tie member extending through said body member and opposed apertures thereof for each yoke member, each tie member being secured to the opposed arms of a yoke member.

8. In a universal joint, a pair of like yoke members each made of two complemental stampings secured together, each arm of each yoke member having an inwardly open annular groove to act as half a ball race, an open-ended box-like body member which is also a stamping and having an outwardly opening annular groove in each face thereof to complete a ball race with the groove in each said yoke arm, a series of balls in each said race, said body member having an aperture inside each ball race portion thereof, a tie member extending through said body member and opposed apertures thereof for each yoke member, each tie member being secured to the opposed arms of a yoke member, and a block of relatively soft lubricant retaining material in said body part, said block being provided with crossed apertures to accommodate said tie members.

References Cited in the file of this patent

UNITED STATES PATENTS

| | | |
|---|---|---|
| 1,317,842 | Ware | Oct. 7, 1919 |
| 1,843,764 | Galloway et al. | Feb. 2, 1932 |
| 2,067,282 | Padgett | Jan. 12, 1937 |
| 2,208,547 | Murphy | July 16, 1940 |
| 2,447,882 | Warner | Aug. 24, 1948 |